(12) United States Patent
Erner

(10) Patent No.: US 9,259,994 B2
(45) Date of Patent: Feb. 16, 2016

(54) AUTOMOTIVE GLAZING

(71) Applicant: Pilkington Group Limited, Lancashire (GB)

(72) Inventor: Wolfgang Erner, Iserlohn (DE)

(73) Assignee: PILKINGTON GROUP LIMITED, Lancashire (GB)

( * ) Notice: Subject to any disclaimer, the term of this patent is extended or adjusted under 35 U.S.C. 154(b) by 0 days.

(21) Appl. No.: 14/360,435

(22) PCT Filed: Nov. 26, 2012

(86) PCT No.: PCT/GB2012/052919
§ 371 (c)(1),
(2) Date: May 23, 2014

(87) PCT Pub. No.: WO2013/076513
PCT Pub. Date: May 30, 2013

(65) Prior Publication Data
US 2014/0367989 A1  Dec. 18, 2014

(30) Foreign Application Priority Data

Nov. 25, 2011  (GB) .................................. 1120340.3

(51) Int. Cl.
*B60J 1/02* (2006.01)
*B60J 1/00* (2006.01)
*B60J 10/00* (2006.01)

(52) U.S. Cl.
CPC *B60J 1/004* (2013.01); *B60J 1/006* (2013.01); *B60J 1/02* (2013.01); *B60J 10/0071* (2013.01); *Y10T 428/24777* (2015.01)

(58) Field of Classification Search
CPC .............. B60J 1/02; B60J 1/004; B60J 1/005; B60J 1/006; B60J 10/0071; B60J 10/0074; B60J 10/0077; B60J 10/008; B60J 10/02; B60J 10/04; B60J 10/06; B62D 25/081; B62D 65/06
See application file for complete search history.

(56) References Cited

U.S. PATENT DOCUMENTS

| 4,571,278 A | 2/1986 | Kunert |
| 4,606,159 A | 8/1986 | Kunert |

(Continued)

FOREIGN PATENT DOCUMENTS

| CN | 2936813 Y | 8/2007 |
| DE | 19630177 A1 | 1/1998 |

(Continued)

OTHER PUBLICATIONS

International Search Report (PCT/ISA/210) mailed on Jan. 2, 2013, by the European Patent Office as the International Searching Authority for International Application No. PCT/GB2012/052919.

(Continued)

*Primary Examiner* — Glenn Dayoan
*Assistant Examiner* — Paul Chenevert
(74) *Attorney, Agent, or Firm* — Buchanan Ingersoll & Rooney PC

(57) ABSTRACT

An elongate glazing component such as a water-tray mounting profile is attached to an automotive glazing adjacent an edge thereof to extend along at least part of the edge. At least one small, generally flat reinforcing member is bonded by adhesive to the inner face of the glazing adjacent the glazing component, each reinforcing member having a contact area for bonding to the inner face of the glazing, and a flange which extends over part of the elongate glazing component and is in contact with it. The flange may be generally parallel to the inner face of the glazing. Preferably the adhesive is cured by ultraviolet light and shrinks on curing. This property may be used to compress an attachment limb of the water-tray mounting profile, thereby holding it more securely. The arrangement may be used to attach a water-tray to a vehicle windscreen without support from the vehicle bodywork.

20 Claims, 2 Drawing Sheets

(56) References Cited

U.S. PATENT DOCUMENTS

| | | | |
|---|---|---|---|
| 4,738,482 | A | 4/1988 | Bohm et al. |
| 4,888,929 | A | 12/1989 | Vaughan et al. |
| 4,891,913 | A | 1/1990 | Shimura et al. |
| 4,933,032 | A | 6/1990 | Kunert |
| 4,938,521 | A | 7/1990 | Kunert |
| 4,956,941 | A | 9/1990 | Vaughan |
| 5,446,508 | A | 8/1995 | Kitchen |
| 5,456,049 | A | 10/1995 | Goto et al. |
| 5,551,197 | A | 9/1996 | Repp et al. |
| 5,577,798 | A | 11/1996 | Ichinohe et al. |
| 5,603,546 | A | 2/1997 | Desir, Sr. |
| 5,669,657 | A | 9/1997 | Miyazawa |
| 5,779,301 | A | 7/1998 | Ito |
| 5,809,706 | A | 9/1998 | Neaux |
| 5,851,045 | A | 12/1998 | Muramatsu |
| 6,334,646 | B1 | 1/2002 | Oami |
| 6,375,254 | B1 | 4/2002 | Pätz |
| 6,769,700 | B2 | 8/2004 | Ortmuller et al. |
| 7,114,768 | B2 | 10/2006 | Aoki et al. |
| 7,156,455 | B2 | 1/2007 | Iimori et al. |
| 7,591,117 | B2 | 9/2009 | Kiriakou |
| 8,449,016 | B2 * | 5/2013 | Timmermann .......... 296/146.15 |
| 2001/0001972 | A1 | 5/2001 | Soldner |
| 2001/0034978 | A1 | 11/2001 | Iimori et al. |
| 2003/0090122 | A1 | 5/2003 | Meizlish |
| 2005/0218703 | A1 | 10/2005 | Aoki et al. |
| 2006/0232093 | A1 | 10/2006 | Boehm et al. |
| 2007/0246966 | A1 | 10/2007 | Polke |
| 2008/0169388 | A1 | 7/2008 | Torigoe et al. |
| 2010/0244483 | A1 | 9/2010 | Erner et al. |
| 2011/0047905 | A1 | 3/2011 | Erner |
| 2011/0115261 | A1 | 5/2011 | Platt et al. |
| 2013/0257104 | A1 * | 10/2013 | Lyon .............................. 296/201 |
| 2014/0145463 | A1 * | 5/2014 | Takayama ................... 296/1.08 |
| 2014/0346803 | A1 * | 11/2014 | Timmermann et al. ......... 296/93 |
| 2014/0374401 | A1 * | 12/2014 | Nakagawa ................... 219/203 |

FOREIGN PATENT DOCUMENTS

| | | | |
|---|---|---|---|
| DE | 29917405 | U1 | 12/2000 |
| DE | 10022020 | A1 | 2/2001 |
| DE | 10017169 | A1 | 3/2001 |
| DE | 19939191 | A1 | 3/2001 |
| DE | 4308214 | A1 | 12/2005 |
| DE | 102005012967 | A1 | 12/2005 |
| DE | 102005012264 | A1 | 9/2006 |
| DE | 202008009712 | U1 | 11/2008 |
| EP | 0545896 | A1 | 6/1993 |
| EP | 0859705 | A1 | 8/1998 |
| EP | 1280675 | A1 | 2/2003 |
| EP | 1526019 | A2 | 4/2005 |
| FR | 2857911 | A1 | 1/2005 |
| JP | 1128413 | U | 9/1989 |
| JP | 5185839 | A | 7/1993 |
| JP | H05213072 | A | 8/1993 |
| JP | 6297962 | A | 10/1994 |
| JP | 7101238 | A | 4/1995 |
| JP | 8011550 | A | 1/1996 |
| JP | S61138612 | U | 8/1996 |
| JP | 9202142 | A | 8/1997 |
| JP | 2001310633 | A | 11/2001 |
| JP | 2003532574 | A | 11/2003 |
| JP | 2005289318 | A | 10/2005 |
| JP | 2007203862 | A | 8/2007 |
| WO | 9717221 | A1 | 5/1997 |
| WO | 0185481 | A1 | 11/2001 |
| WO | WO 2008/138959 | A2 | 11/2008 |
| WO | 2009086870 | A1 | 7/2009 |
| WO | WO 2009/112545 | A1 | 9/2009 |

OTHER PUBLICATIONS

UK Search Report Under Section 17 dated Sep. 7, 2007 issued in the Great Britain Patent Application No. GB0709316.4. (1 pg).

UK Search Report Under Section 17 dated Jul. 11, 2008 issued in the Great Britain Patent Application No. GB0804595.7. (1 pg).

International Search Report (PCT/IB/304) issued Jan. 12, 2009 in the International Application No. PCT/EP2008/055933. (8 pgs).

Japanese Office Action dated Oct. 23, 2012 issued in the Japanese Patent Application No. 2010-507917 and partial English-language summary. (7 pgs).

Chinese Notification of the Second Office Action dated Oct. 19, 2012 issued in the Chinese Patent Application No. 200980108806.X and English language translation. (18 pgs).

English language translation of Japanese Second Official Action dated Feb. 25, 2014 issued in Japanese Patent Application No. 2010-550199. (3 pgs).

UK Search Report Under Section 17 dated Mar. 27, 2012 issued in corresponding Great Britain Patent Application No. GB1120340.3. (1 pg).

* cited by examiner

AUTOMOTIVE GLAZING

BACKGROUND

The present invention relates to an automotive glazing, which may be a windscreen for a vehicle, especially a road vehicle, e.g. a car. More specifically, the invention relates to an automotive glazing having a glazing component, especially an elongate glazing component such as a seal, dam or mounting profile, attached to one edge of the glazing. In particular, the invention relates to a windscreen having a mounting profile attached to its lower edge, wherein the mounting profile may be for mounting a further component, e.g. one which serves as a water management device and usually also as a rest area for windscreen wipers. Such a further component is generally known as a "cowling", "water-tray" or "water-box".

In recent years it has become common practice to provide a rest area for windscreen wipers at least partly below the level of the bonnet or hood of a car. This reduces wind resistance and wind noise, and improves the appearance of the vehicle since the wipers are less prominent, and may even be partially hidden. A component known as a "water-tray" or "water-box" is provided which extends from the lower edge of a windscreen to a position a short way under the bonnet to collect water running off the windscreen and channel it into outlets provided for this purpose at the sides of the vehicle. This process of controlling the flow and discharge of water is sometimes referred to as "water management".

Preferably the water-tray is flush with the lower edge of the windscreen, so that the wiper blades can pass from the windscreen onto the water-tray without hindrance or damage. This means that the water-tray can only be attached to the windscreen via the lower face (i.e. the inward-facing face) of the windscreen, so that the upward-facing outer face remains clear. Even when the water-tray is not perfectly flush with the windscreen, e.g. because a seal or flange overlaps the windscreen, components by means of which the water-tray may be attached to the windscreen cannot be placed on the upward-facing outer face of the windscreen because the components would protrude excessively from the windscreen.

One example of an arrangement for attaching a water-tray to a windscreen is disclosed in DE 199 39 191. A number of hook-shaped profile pieces are bonded to the underside of the windscreen and the water-tray is clipped directly into the hook-shaped profile pieces by means of prongs extending from the water-tray, the water-tray sealing directly against the windscreen. A disadvantage of this arrangement is that the hooks of the profile pieces and the prongs of the water-tray tend to flex and deform under load, with the result that the water-tray sags below its intended position, and the seal to the windscreen is broken.

Another example of an attachment arrangement is disclosed in U.S. Pat. No. 6,769,700. This arrangement makes use of the vehicle bodywork to provide support for the water-tray, which is attached by means of a reinforced profiled element between the windscreen and the water-tray. This profiled element is first attached to the underside of a windscreen by double-sided adhesive tape. A bead of adhesive, which is used to bond the windscreen to the mounting flange of the vehicle bodywork, is allowed also to extend over part of the profiled element, thereby supporting it. Furthermore, the mounting flange of the vehicle bodywork extends immediately below the profiled element, further supporting it, and preventing it from being deflected downwards when force is applied to the profiled element, usually via the water-tray, which is clipped into position in the profiled element.

However, legislation to improve pedestrian safety requires vehicle bodywork to be readily deformable in the event of an impact between a pedestrian and the front or bonnet of a car. As a result, hard and rigid structures such as the mounting flange for the windscreen are not allowed to extend towards the front of the car at the level of the water-tray, and so can no longer be used to support the water-tray. Without the support of the bodywork, it has been found that the bond provided by double-sided adhesive tape is not sufficient to keep a water-tray mounting profile (i.e. the component referred to as the "profiled element" in U.S. Pat. No. 6,769,700) in position attached to the windscreen.

It is of course important that the water-tray is held tightly against the windscreen and forms a good seal with it, despite the stresses that the water-tray endures in service, e.g. due to thermal expansion and contraction, wind loading, and the pressure of the wipers. The water-tray mounting profile is therefore designed to hold the water-tray securely, i.e. with a high retention force, and so significant force is also required to install the water-tray by clipping it into the mounting profile. Without support from the vehicle bodywork, the bond between the mounting profile and the lower face of the windscreen must withstand all of this installation force.

However, it is not feasible simply to use a stronger adhesive to strengthen the bond between the mounting profile and the lower face of the windscreen, because the glass surface of the windscreen cannot withstand forces beyond a certain magnitude. When this level is exceeded, the glass surface suffers shelling, i.e. it is damaged by the forces transmitted to it by the adhesive with the result that fragments of glass come away from the surface. Furthermore, the water-tray mounting profile is normally mainly composed of polypropylene, to which few adhesives bond satisfactorily in any case.

One solution is offered by WO 2008/138959 and WO 2009/112545. In these publications, a mounting strip is employed which is itself strongly bonded to the windscreen by adhesive and extends along its lower edge. The mounting strip provides a cavity into which the water-tray mounting profile may be inserted. This allows the water-tray mounting profile to be attached later, and so minimises storage and distribution costs. In practice the mounting strip needs to be rigid, and so it is normally fabricated from metal. Metal has the additional advantage that it can be strongly bonded to glass by a wide range of adhesives. While providing sufficient bond strength and support for the water-tray, the use of a metal mounting strip means that this solution adds weight to the assembly. This is undesirable, since vehicle manufacturers are constantly striving to reduce the weight of vehicles in order to improve their fuel efficiency.

A different approach is to modify the water-tray mounting profile to allow the water-tray to be installed with a much lower force, while still providing a high retention force for the water-tray. US 2011/0115261 seeks to achieve this by providing the water-tray mounting profile with a detent or barb. The detent is positioned in a recess in the mounting profile which receives a barbed prong or ridge extending from the water-tray. Although this arrangement does indeed allow installation of the water-tray with less force, it is still found that use of double-sided adhesive tape alone to bond the water-tray mounting profile to the windscreen is unsatisfactory over its expected service life.

Water-tray mounting profiles of the type described in the above documents have become a common way of attaching a water-tray to a windscreen. As previously mentioned, the mounting profiles are reinforced, namely by metal inserts which stiffen the profile, preventing it deflecting under load. However, the lower edge of a windscreen is normally curved, and the mounting profile must adopt this curvature when it is attached to the windscreen. The reinforcement of the mounting profile naturally makes it resistant to bending, and it has been found desirable to use apparatus such as a jig to assist in bending the mounting profile to the desired curvature before offering it up to the lower edge of the windscreen. Such apparatus is machined to correspond to the actual curvature of a particular windscreen (for a particular vehicle), so different apparatus is needed for each different windscreen (for different vehicles), which is expensive.

SUMMARY

It would be desirable to provide a means of attaching a glazing component to an automotive glazing, which achieves a strong bond and provides good support to the component, sufficient to maintain it in position without the support of the vehicle bodywork. Such a bond should be achieved without damaging the glass, or adding significant weight or cost.

It has now been realised that it is possible to provide alternative support to the glazing component from the glazing itself, without the need for support from the vehicle bodywork. Advantageously, such alternative support is localised, providing reinforcement to the glazing component where it is needed.

According to a first aspect of the present invention there is provided an automotive glazing for a vehicle, the glazing having two major faces, comprising an inner face which faces the interior of the vehicle when the glazing is installed in the vehicle, and an outer face which faces outwardly, the glazing further having at least one edge, wherein an elongate glazing component is attached adjacent the edge of the glazing so that it extends along at least part of the edge, and at least one reinforcing member, which is small in relation to the elongate glazing component, is bonded to the inner face of the glazing adjacent the elongate glazing component, and wherein each reinforcing member has a contact area by means of which it is bonded to the inner face of the glazing, and a flange which extends over part of the elongate glazing component and is in contact with it, thereby holding the elongate glazing component in position relative to the glazing.

The use of relatively small reinforcing members which are bonded directly to the surface of the glazing provides localised support exactly where it is needed. Consequently, the combination of a separate water-tray mounting profile and a plurality of reinforcing members has been found to provide a high level of support to a water-tray mounted adjacent the lower edge of a vehicle windscreen. Forces encountered in service, for example due to thermal expansion, wind loading, wiper pressure or during installation, are withstood without damage. The reinforcing members transfer these forces from the water-tray mounting profile to the windscreen via their bond to the latter, and do so without damage to the windscreen, and without the need for support from the vehicle bodywork.

Preferably, the flange of each reinforcing member extends generally parallel to the inner face of the glazing, and is offset from the contact area by a step so that the flange is not continuous with the contact area, thereby defining a space which accommodates part of the elongate glazing component. Alternatively, if the reinforcing member is bonded to the inner face of the glazing with adhesive, an especially thick layer of adhesive, which in effect acts as a spacer, may be used.

The arrangement described above has been found to yield a strong bond between each reinforcing member and the inner face of the glazing. For instance, the bond may withstand a pulling force of at least 200 N, preferably at least 250 N, more preferably at least 300 N.

Small, generally flat reinforcing members are advantageous because they add little to the thickness of the glazing, which may be a windscreen, for example. This means that a high packing density may be achieved when the glazings are transported, e.g. from the glazing manufacturer to the vehicle manufacturer, thereby reducing transport costs. For the same reason, each reinforcing member does not protrude beyond the lower edge of the glazing. This also reduces the likelihood of damage.

Short cycle times (i.e. the time required for each part at each stage of the manufacturing process) are advantageous, and so it is preferable to use a quick curing adhesive to bond the reinforcing member to the glazing. The adhesive may be cured by an activation process, for example the application of heat or light. Especially preferred is an adhesive which is cured by ultraviolet light, because ultraviolet light can be directed at the adhesive at the appropriate moment by a suitable ultraviolet lamp, i.e. it is highly controllable.

In this case, it is preferable if the material selected for the reinforcing member allows ultraviolet light to pass through it readily, because this allows the adhesive to be cured without the need to turn the glazing over or otherwise provide access from the other side of the glazing. Furthermore, some glazings are printed with opaque ink adjacent their edges, which might preclude curing the adhesive by directing ultraviolet light from the other side of the glazing. In any case, since glass absorbs ultraviolet light, curing of the adhesive by ultraviolet light directed through the glazing would require a much larger quantity of ultraviolet light, which slows the cycle time and may require additional health and safety precautions. Ideally, the material of the reinforcing member is transparent to ultraviolet light.

An adhesive which shrinks on curing is also advantageous, because the contraction of the adhesive on curing causes the reinforcing member to be pulled towards the inner surface of the glazing, and this allows the glazing component to be held more tightly.

In a preferred embodiment of the invention the elongate glazing component is a water-tray mounting profile which is attached to the glazing by an attachment limb of the water-tray mounting profile bonded to the inner face of the glazing. The flange of the reinforcing member extends over the attachment limb of the water-tray mounting profile. In the case where there is a step between the flange and the contact area of the reinforcing member, the attachment limb is accommodated in the space between the flange and the inner face of the glazing. Shrinkage of the adhesive on curing causes the attachment limb of the mounting profile to in effect be clamped between the flange of the reinforcing member and the inner face of the glazing.

According to a second aspect of the invention, there is provided a method of attaching a glazing component such as a water-tray mounting profile to an automotive glazing, the glazing having two major faces, comprising an inner face which faces the interior of the vehicle when the glazing is installed in the vehicle, and an outer face which faces outwardly, the glazing further having an edge which forms the lower edge when installed, the method comprising adhesively bonding a plurality of generally flat reinforcing members to the inner face of the glazing adjacent the lower edge thereof, each reinforcing member having a contact area for bonding to the inner face of the glazing, and a flange which extends towards the lower edge of the glazing and generally parallel to its inner face, the flange and the inner face of the glazing together defining a space in the form of a recess, and receiving the glazing component in the recess.

This method of attachment allows the glazing component to be attached later, so the glazing may be transported with just the reinforcing members attached, thereby allowing a higher packing density to be achieved, saving on transport costs. The glazing component is then added when the glazing has reached its destination.

According to a third aspect of the invention, there is provided a method of attaching an elongate glazing component such as a water-tray mounting profile to an automotive glazing, the glazing having two major faces, comprising an inner face which faces the interior of the vehicle when the glazing is installed in the vehicle, and an outer face which faces outwardly, the glazing further having at least one edge, the method comprising bonding the glazing component to the inner face of the glazing adjacent the edge thereof so that it extends along at least part of the edge, then bonding at least one generally flat reinforcing member to the inner face of the glazing adjacent the elongate glazing component, each reinforcing member having a contact area for bonding to the inner face of the glazing, and a flange which extends over part of the glazing component and is in contact with it, so that the reinforcing member holds the elongate glazing component in position relative to the glazing.

The reinforcing members are small in relation to the elongate glazing component. For instance, the number of reinforcing members required to span the full length of the elongate glazing component, the reinforcing members being placed end-to-end, may vary between 10 and 100. Preferably the number of reinforcing members required varies between 20 and 60.

This is distinct from the number of reinforcing members actually employed in practice, which is much lower, because gaps may be left between the reinforcing members, and because the elongate glazing component may only require local support, e.g. at its ends, in which case as few as two reinforcing members may suffice, or at the middle, in which case one reinforcing member may suffice.

In this aspect of the invention, the glazing component may be held more tightly, since it no longer needs to be a sliding fit in the space between the flange of the reinforcing member and the inner face of the glazing because the glazing component is already in situ when each reinforcing member is bonded to the glazing.

Preferably, the reinforcing member is bonded to the inner face of the glazing by an adhesive which shrinks on curing, and the elongate glazing component is a water-tray mounting profile, the method comprising bonding an attachment limb of the water-tray mounting profile to the inner face of the glazing before bonding the plurality of reinforcing members thereto, curing the adhesive so that it shrinks, thereby compressing the attachment limb between the flange of each reinforcing member and the inner face of the glazing. This variant results in the attachment limb of the water-tray mounting profile being held especially tightly. It is in effect clamped to the glazing, and the reinforcing members serve as reinforcement, preventing the mounting profile becoming detached even when subjected to considerable forces, e.g. on installation of the water-tray.

BRIEF DESCRIPTION OF THE DRAWINGS

The invention will now be further described by way of the following non-limiting specific embodiments, which are illustrated with reference to the accompanying drawings in which:

FIG. 3 shows some additional elements which have been omitted from FIG. 1 for clarity.

DETAILED DESCRIPTION

Figure 1:
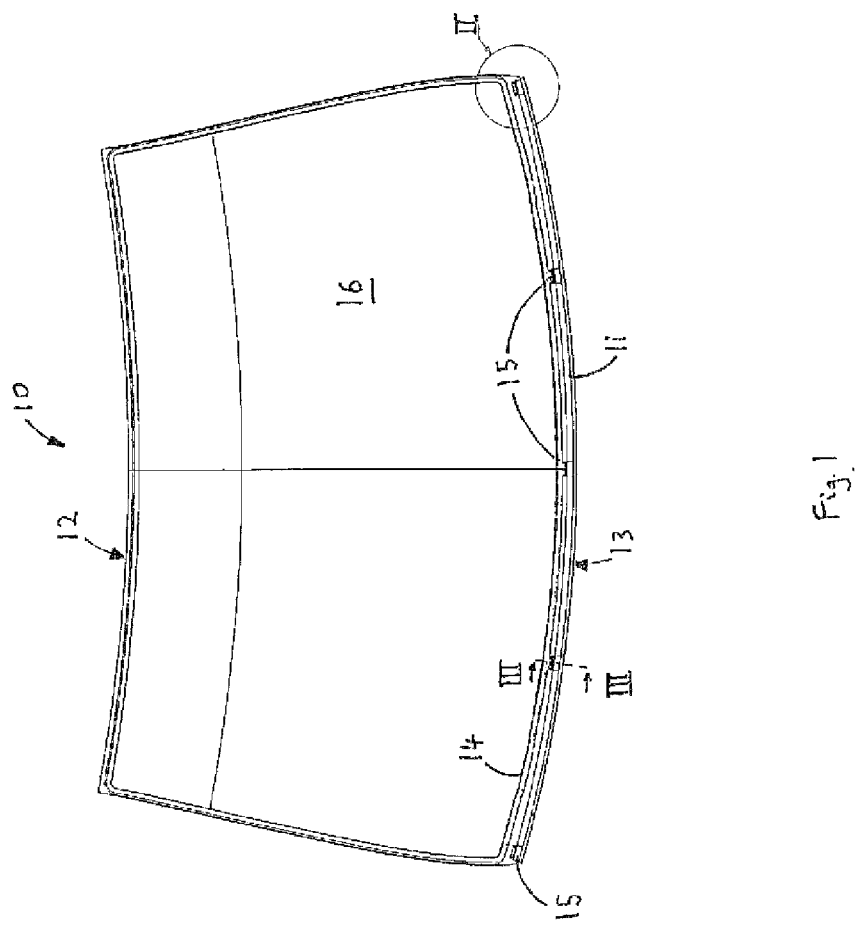
FIG. 1 is a view of an automotive glazing, namely a windscreen, with a glazing component, namely a water-tray mounting profile, bonded to it.

FIG. 1 depicts a windscreen 10 for a vehicle, e.g. a car, with an elongate glazing component in the form of a water-tray mounting profile 11 bonded to it adjacent one edge. The windscreen is viewed from the interior side, i.e. as if the viewer were inside the car, and has an upper edge 12 and a lower edge 13. During assembly of the vehicle the windscreen 10 is installed by bonding it to the bodywork of the vehicle (not shown in FIG. 1) in conventional manner by a bead of adhesive 14. It is also conventional to install the windscreen at an angle to the vertical, which is known as the rake angle. A number (five in this case) of generally flat reinforcing members 15 is bonded to the inner face 16 of the windscreen. The reinforcing members 15 may be in the form of small, generally flat, carrier plates. Although the carrier plates are shown spaced apart and evenly distributed along the width of the lower edge 13 (corresponding to the width of the windscreen), they may also be distributed in uneven manner, for instance with the plates being more closely spaced in the corners of the windscreen, i.e. at the ends of the water-tray mounting profile, or alternatively or additionally being more closely spaced in the middle of the windscreen. More, or fewer, than five plates may be employed. Furthermore, at least some of the plates may be placed side by side in contact with each other, i.e. juxtaposed. This arrangement is useful at a sharply curved corner of the windscreen, where it has been found in practice that the water-tray mounting profile may first begin to detach from the windscreen.

Figure 2:
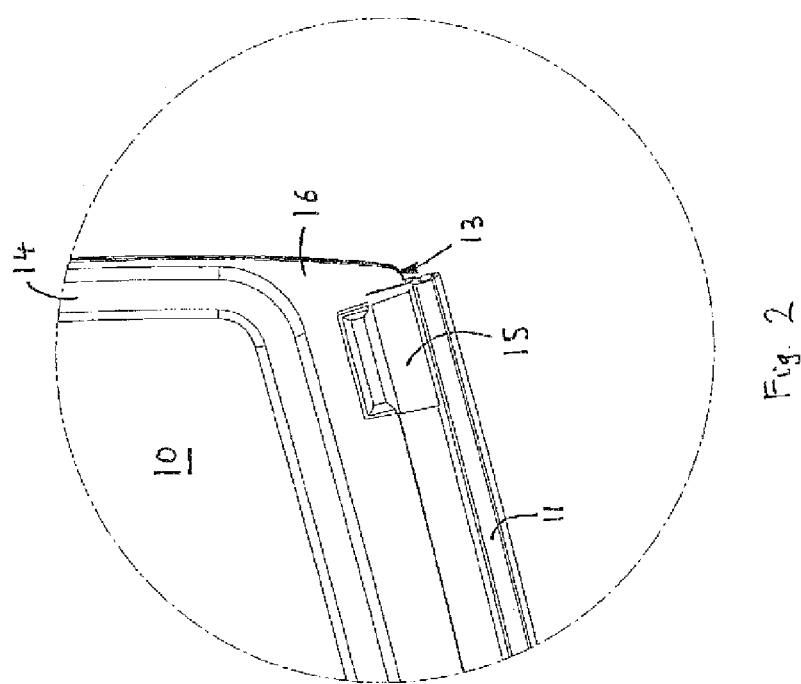
FIG. 2 is an enlargement of one corner of the automotive glazing of FIG. 1.

FIG. 2 shows a corner of FIG. 1, greatly enlarged, so that the elements of FIG. 1 may be seen more clearly. In particular, it may be seen that the reinforcing member 15 is trapezoidal in outline, with the longer of the two parallel sides closest to the lower edge 13 of the windscreen. This is advantageous, because it allows a plurality of reinforcing members to be positioned consecutively in side by side contact, as mentioned above, to form a continuous series, while conforming to the curvature of the lower edge of the windscreen, so that the reinforcing members maintain a constant separation from the lower edge. The angle between the two non-parallel sides is preferably selected to correspond to a radius of curvature which is equal to, or less than, the smallest radius of curvature possessed by the lower edge of the windscreen. Alternatively, the reinforcing members may be square or rectangular in outline. A mixture of different shapes of reinforcing member may also be employed.

Figure 3:
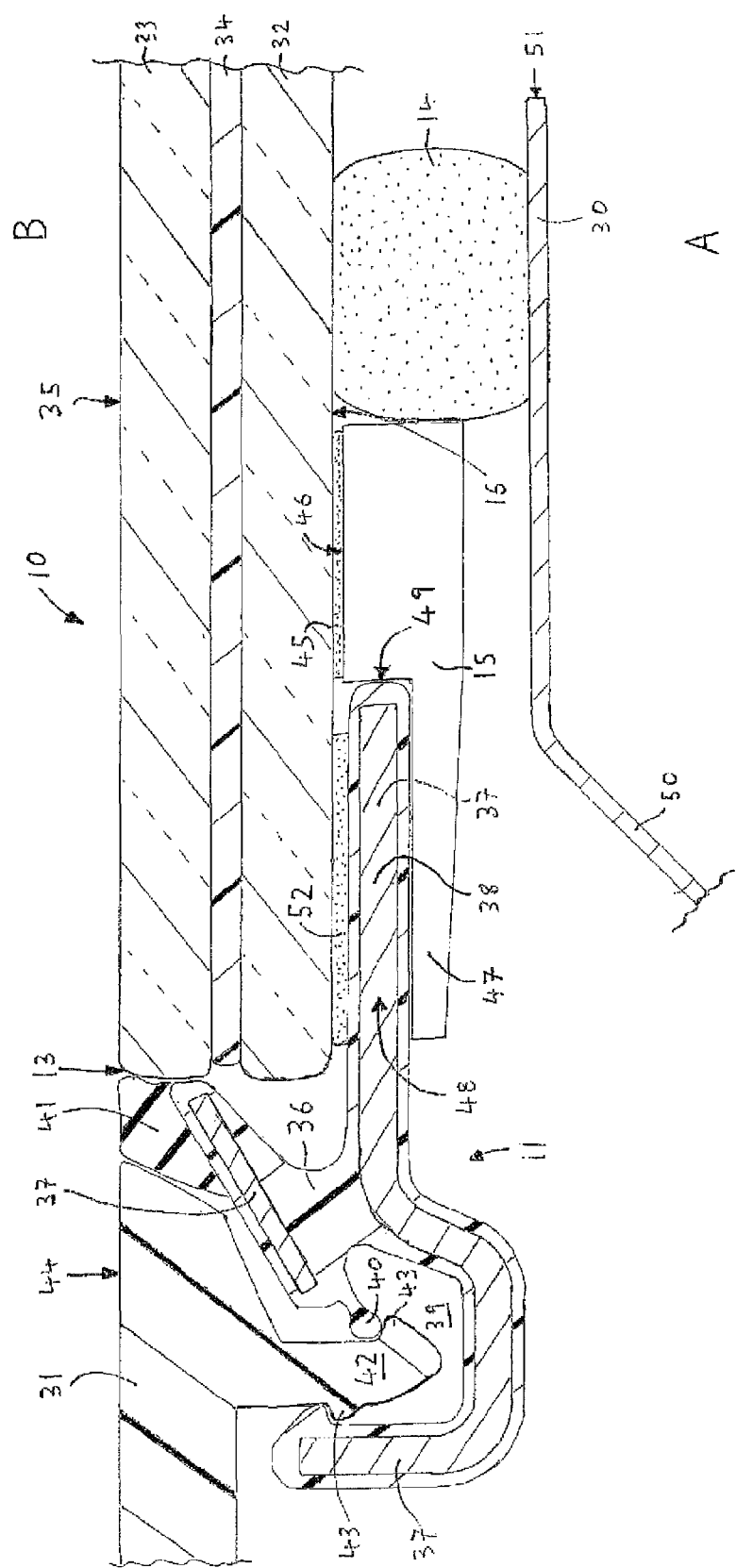
FIG. 3 is a sectional view of the automotive glazing of FIG. 1, the section being taken on line III-III shown in FIG. 1.

FIG. 3 is a section on line III-III of part of the windscreen of FIG. 1. As previously mentioned, FIG. 1 depicts the windscreen as seen from the interior, and owing to the rake angle at which the windscreen is installed, also from the underside. The section taken on line III-III has therefore been inverted to produce FIG. 3, so that the drawing as depicted is not upside down. In addition to many of the elements shown in FIGS. 1 and 2, part of a mounting flange 30 of the vehicle bodywork 50 is shown, as is part of a water-tray 31. The mounting flange 30 extends around an aperture (not shown) in the vehicle bodywork, and has an edge 51 which defines the aperture. The windscreen 10 is bonded to the mounting flange 30 by the bead of adhesive 14, thereby closing the aperture. The vehicle bodywork 50 is spaced from the water-tray 31 and its mounting profile 11 to avoid the presence of hard structures close to the exterior surface of the vehicle, so as to reduce the danger to a pedestrian in the event of an impact. Letter A denotes the inside of the vehicle and letter B the outside.

The windscreen 10 is laminated and comprises an inner ply of glass 32 and an outer ply of glass 33. The two plies are bonded together in conventional fashion by a ply of plastics interlayer 34, normally polyvinyl butyral, or pvb for short. The windscreen has an inner face 16 which faces the interior of the vehicle when the windscreen is installed in the vehicle, and an outer face 35 which faces outwardly. Normally, the windscreen is printed with an opaque peripheral band (not shown), known as an obscuration band because it obscures the mounting flange 30, adhesive 14 and other elements from external view. The obscuration band also protects the adhesive 14 from the degradation by daylight, especially its ultraviolet component. The obscuration band has been omitted from the drawings for clarity, but could be provided on the inner face 16 of the windscreen, or internally within the laminate, on either of the interfaces between one of the plies of glass 32, 33 and the interlayer 34.

Continuing to refer to FIG. 3, the water-tray mounting profile 11 comprises a plastic body 36 reinforced by metal inserts 37 to provide rigidity. The mounting profile 11 also comprises an attachment limb 38 for attaching the mounting profile to the windscreen, a channel 39 for receiving the water-tray 31 and a detent 40 which secures the water-tray in position in the channel 39 while allowing the water-tray to be inserted in the channel relatively easily. The mounting profile further comprises a seal 41 attached to the plastic body 36 and positioned so that it fills the gap between the windscreen and the water-tray, ensuring a water-tight joint between the two components. The seal 41 may be composed of a relatively soft, compliant, plastics material such as thermoplastic elastomer (TPE) to enable it to conform to and seal against the adjacent components, while the body 36 may be composed of a stiffer plastics material such as polypropylene, and is reinforced with metal strips, e.g. of aluminium. A water-tray mounting profile of this type is available from Elkamet Kunststofftechnik GmbH of Georg-Kramer-Strasse, 35216 Biedenkopf, Germany.

One unfortunate characteristic of polypropylene is that few adhesives adhere to it satisfactorily, which is why an alternative bonding method is required. However, double-sided adhesive tape does adhere to polypropylene, but is only capable of a relatively weak bond which, as previously mentioned, does not withstand the forces exerted upon the water-tray mounting profile, either during installation or in service or both. Nevertheless, in practice it is convenient to attach the water-tray mounting profile 11 to the windscreen 10 by double-sided adhesive tape 52 first, before bonding the reinforcing members to the inner face of the windscreen, to ensure that the mounting profile is accurately positioned.

As previously mentioned, the water-tray 31 is received in the channel 39 of the water-tray mounting profile 11. More specifically, the water-tray is provided with a downwardly-dependent wall or rib 42, or alternatively a series of prongs, which is inserted into the channel 39. Preferably, the rib 42 is provided with one or more raised portions 43 which may engage corresponding portions on the walls of the channel. More preferably, as previously mentioned, a detent 40 is provided on the body 36 of the mounting profile. The detent protrudes into the channel 39 and is adapted to yield during insertion of the rib 42 into the channel 39, but resist removal of the rib and thus the water-tray. This arrangement reduces the level of force required to install water-tray, while not compromising the ability of the mounting profile to retain the water-tray securely.

The water-tray mounting profile 11 and water-tray 31 are shaped, configured and dimensioned so that when assembled, the upper or external surface 44 of the water-tray is flush with the windscreen 10. Furthermore, the seal 41 is arranged also to be flush with both the water-tray and the windscreen.

One of the generally flat reinforcing members 15 is shown in section in FIG. 3. It is bonded by an adhesive 45 to the inner face 16 of the windscreen inset from the lower edge 13 thereof. The reinforcing member comprises a contact area 46 for bonding to the inner face of the windscreen, and a flange 47 which extends towards the lower edge 13 of the windscreen. The contact area may be slightly recessed to provide space for adhesive 45, alternatively or additionally a wall or dam (not shown) may be provided at the edges of the contact area, again to provide space for the adhesive. The wall or dam may also serve to contain the adhesive 45.

The adhesive 14, which bonds the windscreen 10 to the mounting flange 30, may be allowed to extend over the reinforcing member 15 to bond it even more securely (in a manner not shown in FIG. 3). In this event, sufficient adhesive 14 is provided so that some adhesive is caused to flow sideways as the windscreen is inserted into the aperture in the vehicle bodywork. Part of the excess adhesive 14 flows into the space between the exposed face of the reinforcing member and the mounting flange 30 of the vehicle bodywork.

The flange 47 of each reinforcing member 15 extends in a direction generally parallel to the inner face 16 of the windscreen and downwards towards the lower edge 13 of the windscreen. The flange 47 is spaced from the inner face 16, thereby defining an open-ended space or recess 48 in the form of a slot. Preferably, a step 49 is provided between the flange 47 and the contact area 46 of the reinforcing member 15 so that the flange is offset from the contact area and not continuous with it. The step 49 serves to space the flange 47 from the inner face 16 thereby further defining the space or recess 48. The step also partly governs the depth of the recess 48 (taking its depth to be in the direction normal to the inner face 16), and normally constitutes the greater part of the depth of the recess, with the thickness of the layer of adhesive 45 adding somewhat to the depth of the recess. Although stepped reinforcing members are preferred, alternatives are possible, for example, if no step is provided in the reinforcing member, the depth of the recess may be provided by a spacer or by using a thick layer of adhesive.

It has been found advantageous to form the recess 48 between the flange 47 and the inner face 16 because this provides a strong structure. Alternatives, such as using a thicker reinforcing member, and providing the recess within the thickness of the plate, create additional interfaces and internal angles which act as stress concentrators and are a source of weakness, leading to fracture under stress. In particular, in its preferred configuration the reinforcing member is free from re-entrant angles. As has already been mentioned, the use of thin reinforcing members is also advantageous in increasing the packing density of windscreens which is achievable when the windscreens are packed for shipping.

Examples of preferred dimensions for a stepped reinforcing member include the following possibilities. The reinforcing member may have a width of about 20-50 mm (this is in fact the longest dimension of the plate illustrated in FIGS. 1 and 2, but it is described as the width because when the plate is in position on the windscreen, this dimension is parallel to the width of the windscreen), length of flange about 7-15 mm, length of contact area about 5-15 mm, and thickness about 2-5 mm. Given that the water-tray mounting profile is generally between 1000 and 2000 mm in length, the reinforcing members are small in relation to the mounting profile. The length of the mounting profile is determined by the width of the lower edge of the windscreen to which the mounting profile is to be attached.

The flange may taper towards its free edge, i.e. the edge which is distant from the contact area.

Preferably the reinforcing member is dimensioned and positioned such that it does not protrude beyond the lower edge of the windscreen. This reduces the risk of damage when packing and shipping the windscreens.

The adhesive 45 should be capable of providing a strong and durable bond between the material of the reinforcing member, which is generally plastic, and glass. The bond should be capable of withstanding temperature variations and high moisture levels which are experienced in service. One suitable class of adhesives is the reactive hot melt adhesives, e.g. heat applied reactive polyurethane. Also, two component adhesives may be used.

Preferably the adhesive 45 is a quick-curing adhesive. During the process of affixing the reinforcing members to the windscreen, it is preferable not to move the windscreen until the adhesive is sufficiently cured to avoid a significant risk of dislodging one or more of the reinforcing members. By reducing the curing time, the length of time taken up by this stage is reduced.

Adhesives which may be very rapidly cured by an activation process, e.g. application of heat, light or other radiation, are therefore particularly preferred. If heat is used, it may be generated locally, either close to the adhesive or within it, for instance by induction or microwave heating. If light is used, the presence of the obscuration band normally prevents it being transmitted through the windscreen, and so it is desirable that the light is transmitted through the reinforcing member instead, thus affecting the choice of material for the reinforcing member. An especially suitable adhesive is one which may be cured by ultraviolet light, such as some acrylic adhesives. Examples of such adhesives are sold under the brand name DELO-PHOTOBOND®, for instance grades AD494 and GB485. These are available from DELO Industrial Adhesives of DELO-Allee 1, 86949 Windach, Germany.

The reinforcing members are preferably composed of a rigid plastic which may be injection moulded and which allows the passage of ultraviolet light, preferably being transparent to ultraviolet light. Suitable plastics include polycarbonate/ABS blends or polyamides. A suitable plastic of the former type is available from Bayer MaterialScience AG of 51368 Leverkusen, Germany, under the brand name Bayblend® T65. A suitable plastic of the latter type is available from EMS-Grivory, which is part of the EMS Group based in Domat/Ems in Switzerland, under the brand name Grilon® PV-15H Nylon 6. This is a nylon reinforced with 15% glass fibre.

As mentioned above, both the mounting flange 30 of the vehicle bodywork and the underlying vehicle bodywork 50 generally are spaced from the water-tray 31 and its mounting profile 11 for pedestrian protection reasons. Accordingly, neither the water-tray 31 nor the mounting profile 11 are in contact with the mounting flange 30 or the underlying bodywork 50, and so the water-tray 31 and mounting profile 11 are not supported by the mounting flange 30 or the underlying vehicle bodywork 50. The water-tray mounting profile is supported solely by the reinforcing members 15 and the windscreen 10, and so a strong bond is required.

In order to provide the support required for the water-tray, it is an important characteristic of the arrangement described above that the combination of a water-tray mounting profile and a plurality of reinforcing members is employed. This arrangement has been found to be more successful than other arrangements, particularly those which omit either the water-tray mounting profile or the plurality of reinforcing members, since the water-tray mounting profile provides improved support for the water-tray, while the reinforcing members in turn provide improved support for the mounting profile.

A preferred method of attachment of the water-tray mounting profile to the windscreen will now be described. An automotive glazing, e.g. a windscreen, is cleaned in conventional manner prior to bonding, and then attached to the inner face of the windscreen in the appropriate position adjacent the edge that will be the lower edge when the windscreen is later installed in the vehicle.

If the surface of the attachment limb of the mounting profile is polypropylene, as is frequently the case, double-sided adhesive tape is preferably used for this bonding step, since few other adhesives adhere satisfactorily to polypropylene. In this case it is desirable to apply an adhesion promoter to the area of the windscreen to which the double-sided tape will be affixed, since the bond strength developed by double-sided tape is otherwise rather low. A suitable adhesion promoter is AP111, which is an isopropyl alcohol based solution available from 3M. This is wiped on to the appropriate part of the windscreen, allowed to evaporate, and any excess is wiped off.

Alternatively, a temporary quick-curing adhesive may be used to provide a preliminary bond between the mounting profile and the windscreen.

Next, a droplet of ultraviolet curing acrylate adhesive is dispensed onto the glass adjacent the water-tray mounting profile at each position at which a reinforcing member is to be attached. It is a characteristic of this adhesive that it shrinks on curing. A corresponding number of reinforcing members is positioned on the glass with the contact area of each reinforcing member in contact with the adhesive, and then held or clamped in position. Each reinforcing member is placed in position with the flange of each reinforcing member extending over and in contact with the attachment limb of the mounting profile.

An ultraviolet lamp is brought into position to illuminate each reinforcing member with ultraviolet light and cure the adhesive. Preferably, an array of ultraviolet lamps is employed, one lamp being aligned with each reinforcing member. The length of time for which the adhesive needs to be irradiated with ultraviolet light in order to cure it varies with the amount of adhesive used and the intensity of the light employed, but it may be in the range from 2 to 20 seconds, preferably around 4 to 6 seconds, balancing the desire for a short cycle time with the need to maintain control of the quantity of ultraviolet light dispensed.

The adhesive shrinks as it is cured by the ultraviolet light. This has the effect of pulling each reinforcing member towards the inner face of the windscreen, compressing the attachment limb of the mounting profile between the flange of each reinforcing member and the inner face of the glazing in the process. The reinforcing member in effect clamps the attachment limb to the windscreen.

This degree of compression, which is provided by the shrinkage of the adhesive when the reinforcing member is bonded to the windscreen with the attachment limb of the mounting profile already in situ on the inner face of the windscreen, is advantageous because it ensures that the mounting profile is held securely over a wide temperature range. Otherwise, differential thermal expansion might cause the attachment limb to become loose in the space defined between the flange of the reinforcing member and the inner face of the windscreen.

Alternatively, a heat activated and curing adhesive may be used, in which case the windscreen and/or each reinforcing member may be pre-heated to facilitate or cause activation of the adhesive. Heating means may be employed to heat the adhesive in situ once it has been dispensed.

In the course of attaching the water-tray mounting profile to the windscreen, it is bent, i.e. elastically deformed, into a curved shape which matches the curvature of the lower edge of the windscreen. Attachment of the mounting profile may be achieved most quickly by placing it in a jig machined to match the curvature of the lower edge of the windscreen, and offering the mounting profile up to all the reinforcing members simultaneously.

Alternatively, if it is preferred to avoid the cost of the jig, the mounting profile may be attached completely manually, offering it up to the lower edge of the windscreen by hand, and bending the mounting profile by hand to fit the lower edge of the windscreen. This method is more suitable for low volume operations.

These methods of attachment employing reinforcing members have been found to produce remarkably strong bonds. Tests were carried out to simulate the insertion of a water-tray in the water-tray mounting profile. These tests used a portable force gauge and measured the force applied to cause failure. The force gauge was attached to the water-tray mounting profile by a wire passed through two small holes drilled 20 mm apart through the metal reinforcement of the mounting profile, and the mounting profile was subjected to a pulling force exerted in a direction normal to the inner face of the windscreen. The arrangement withstood forces in excess of 250 N before failure occurred.

Measurements have been conducted of the force required to detach the water-tray mounting profile from the windscreen. When the mounting profile is bonded only by double-sided adhesive tape, these measurements have established that this bond withstands a force of 100 N at best. However, when the bond is supported and reinforced by reinforcing members according to the invention, the force required to detach the water-tray mounting profile increases to levels in excess of 250 N. This surprising increase in the force required to detach the water-tray mounting profile when supported with reinforcing members demonstrates the effectiveness of these plates in augmenting and reinforcing the bond between the water-tray mounting profile and the windscreen.

The present invention provides an innovative solution to the problem of attaching a glazing component to an automotive glazing such as a windscreen. As a result of the use of generally flat reinforcing members with a flange which extends over part of the glazing component, a high level of support is provided to the glazing component. In particular, a water-tray mounting profile is sufficiently well supported so that the forces to which it and the water-tray itself are subjected to in service are withstood without losing the seal to the windscreen or causing damage to the glass.

As explained above, it has not been found possible to bond the water-tray mounting profile itself more strongly to the windscreen because few adhesives adhere to polypropylene, which is the material commonly used for the mounting profile. Use of a large amount of very strong adhesive, which in effect encapsulates the attachment limb of the mounting profile, has been found to cause damage to the glass. In contrast, the reinforcing members act as bridges which transfer forces experienced by the mounting profile, via the contact area of the reinforcing member and its adhesive bond to the automotive glazing, to a portion of the automotive glazing adjacent the mounting profile. In effect, the reinforcing member functions as a force transfer device.

Furthermore, although the attachment limb of the mounting profile may be held very tightly within the space defined between the flange of the reinforcing member and the inner face of the windscreen, the arrangement is nevertheless able to accommodate stresses resulting from thermal expansion, and this reduces the likelihood of damage to the glass.

Moreover, this arrangement for attaching a water-tray to a windscreen is lighter than known used arrangements, thanks to the use of small plastic reinforcing members rather than a continuous metal carrier. The invention therefore provides a means of attaching a water-tray to a windscreen which provides a strong bond with good support, yet at a lower cost and weight and without damaging the glass.

The invention claimed is:

1. An automotive glazing for a vehicle, the glazing having two major faces, comprising an inner face which faces the interior of the vehicle when the glazing is installed in the vehicle, and an outer face which faces outwardly, the glazing further having at least one edge,
wherein an elongate glazing component is bonded to the inner face of the glazing adjacent the edge of the glazing so that the elongate glazing component extends along at least part of the edge, and at least one reinforcing member, which is small in relation to the elongate glazing component, is bonded to the inner face of the glazing adjacent the elongate glazing component,
and wherein each reinforcing member has a contact area, wherein the reinforcing member is bonded to the inner face of the glazing, and a flange which extends over part of the elongate glazing component and is in contact with the elongate glazing component, thereby holding the elongate glazing component in position relative to the glazing.

2. An automotive glazing as claimed in claim 1, wherein the flange of each reinforcing member extends generally parallel to the inner face of the glazing, and is offset from the contact area by a step so that the flange is not continuous with the contact area, thereby defining a space which accommodates part of the elongate glazing component.

3. An automotive glazing as claimed in claim 1, wherein each reinforcing member is bonded to the inner face of the glazing by an adhesive, and the adhesive bond between each reinforcing member and the inner face of the glazing withstands a pulling force of at least 200 N.

4. An automotive glazing as claimed in claim 1, wherein each reinforcing member does not protrude beyond the edge of the glazing.

5. An automotive glazing as claimed in claim 1, wherein the glazing is installed in an aperture in the bodywork of a vehicle, and the elongate glazing component is a water-tray mounting profile which is spaced from the bodywork of the vehicle, so that the water-tray mounting profile is not in contact with the bodywork.

6. An automotive glazing as claimed in claim 1, wherein each reinforcing member is bonded to the inner face of the glazing by an adhesive, and the adhesive bond between each reinforcing member and the inner face of the glazing withstands a pulling force of at least 250 N.

7. An automotive glazing as claimed in claim 1, wherein each reinforcing member is bonded to the inner face of the glazing by an adhesive, and the adhesive bond between each reinforcing member and the inner face of the glazing withstands a pulling force of at least 300 N.

8. An automotive glazing as claimed in claim 1, wherein each reinforcing member is bonded to the inner face of the glazing by an adhesive which is cured by application of heat or light.

9. An automotive glazing as claimed in claim 1, wherein each reinforcing member is bonded to the inner face of the glazing by an adhesive which is cured by an activation process.

10. An automotive glazing as claimed in claim 9, wherein the adhesive is cured by ultraviolet light, and each reinforcing member allows ultraviolet light to pass therethrough.

11. An automotive glazing as claimed in claim 1, wherein each reinforcing member is bonded to the inner face of the glazing by an adhesive which shrinks on curing.

12. An automotive glazing as claimed in claim 11, wherein the elongate glazing component is a water-tray mounting profile which is attached to the glazing by an attachment limb of the water-tray mounting profile over which the flange of the reinforcing member extends, the attachment limb being accommodated in a space between the flange and the inner face of the glazing, wherein the shrinkage of the adhesive on curing causes the attachment limb of the mounting profile to be clamped between the flange and the inner face of the glazing.

13. A method of attaching an elongate glazing component to an automotive glazing, the glazing having two major faces, comprising an inner face which faces the interior of the vehicle when the glazing is installed in the vehicle, and an outer face which faces outwardly, the glazing further having at least one edge, the method comprising:
    bonding the elongate glazing component to the inner face of the glazing adjacent the edge thereof so that the elongate glazing component extends along at least part of the edge,
    bonding at least one reinforcing member, which is small in comparison with the elongate glazing component, to the inner face of the glazing adjacent the elongate glazing component, each reinforcing member having a contact area for bonding to the inner face of the glazing, and a flange which extends over part of the glazing component and is in contact with the elongate glazing component, so that the reinforcing member holds the elongate glazing component in position relative to the glazing.

14. A method as claimed in claim 13, wherein the reinforcing member is bonded to the inner face of the glazing by an adhesive which shrinks on curing, and the elongate glazing component is a water-tray mounting profile, the method comprising:
    bonding an attachment limb of the water-tray mounting profile to the inner face of the glazing before bonding the plurality of reinforcing members thereto,
    curing the adhesive so that the adhesive shrinks, thereby compressing the attachment limb between the flange of each reinforcing member and the inner face of the glazing.

15. A method as claimed in claim 13, wherein the adhesive bond between the reinforcing member and the inner face of the glazing withstands a pulling force of at least 200 N.

16. A method as claimed in claim 13, wherein the adhesive bond between the reinforcing member and the inner face of the glazing withstands a pulling force of at least 250 N.

17. A method as claimed in claim 13, wherein the adhesive bond between the reinforcing member and the inner face of the glazing withstands a pulling force of at least 300 N.

18. A method as claimed in claim 13, wherein the reinforcing member is bonded to the inner face of the glazing by an adhesive which is cured by application of heat or light.

19. A method as claimed in claim 13, wherein the reinforcing member is bonded to the inner face of the glazing by an adhesive which is cured by an activation process.

20. A method as claimed in claim 19, wherein the adhesive is cured by ultraviolet light, and the reinforcing member allows ultraviolet light to pass through it therethrough.

* * * * *